United States Patent
Cho et al.

(10) Patent No.: US 8,298,092 B2
(45) Date of Patent: Oct. 30, 2012

(54) TRIPOD TYPE CONSTANT VELOCITY JOINT

(75) Inventors: Jeong Hyun Cho, Masan-si (KR); Dae Hwan Kim, Changwon-si (KR); In Sang Lee, Changwon-si (KR); Joung Sik Park, Changwon-si (KR); Sung Baek An, Changwon-si (KR); Seung Man Shin, Ulsan si (KR); Hwan Bum Kang, Changwon-si (KR)

(73) Assignee: Hyundai Wia Corporation (KR)

( * ) Notice: Subject to any disclaimer, the term of this patent is extended or adjusted under 35 U.S.C. 154(b) by 21 days.

(21) Appl. No.: 12/978,238

(22) Filed: Dec. 23, 2010

(65) Prior Publication Data
US 2011/0159969 A1    Jun. 30, 2011

Related U.S. Application Data

(60) Division of application No. 11/927,601, filed on Oct. 29, 2007, which is a continuation of application No. PCT/KR2006/002513, filed on Jun. 28, 2006, now Pat. No. 7,874,924.

(30) Foreign Application Priority Data

May 11, 2006    (KR) .................. 10-2006-0042572

(51) Int. Cl.
F16D 3/205    (2006.01)
(52) U.S. Cl. ........................................ 464/111; 464/905
(58) Field of Classification Search .................. 464/111, 464/123, 124, 132, 905
See application file for complete search history.

(56) References Cited

U.S. PATENT DOCUMENTS

| 3,490,251 A * | 1/1970 | Roethlisberger .............. 464/124 |
| 2006/0205521 A1* | 9/2006 | Yoon ............................. 464/111 |
| 2006/0217205 A1* | 9/2006 | Izumino et al. ............... 464/111 |

* cited by examiner

*Primary Examiner* — Gregory Binda
(74) *Attorney, Agent, or Firm* — Park & Associates IP Law, P.C.

(57) ABSTRACT

A tripod type constant velocity joint comprises a housing having three track grooves defined at trisected positions of the housing and extending in an axial direction, and a spider having three-trunnions projectedly formed at trisected positions of the spider to be respectively inserted into the track grooves, each trunnion having a generally oval or elliptical cross-sectional shape and including at least one independent contact surface at each of two opposing sides subjecting to a load. Inner rollers each has an inner surface of a concavely curved contour for receiving a corresponding trunnion therein, and an outer roller is mounted to each inner roller with a plurality of needle rollers engaged there-between.

16 Claims, 22 Drawing Sheets

TRIPOD TYPE CONSTANT VELOCITY JOINT

REFERENCE TO RELATED APPLICATIONS

This is a divisional application of pending U.S. patent application Ser. No. 11/927,601 filed on Oct. 29, 2007, now U.S. Pat. No. 7,874,924, which is a continuation of International Application PCT/KR2006/002513, filed on Jun. 28, 2006, which designates the United States and claims priority of Korean Patent Application No. 10-2006-0042572, filed on May 11, 2006, the entire contents of which are incorporated herein by reference.

FIELD OF THE INVENTION

The present invention relates to a constant velocity joint, and more particularly to a tripod type constant velocity joint which can form a plurality of contact parts between a polyhedral trunnion having at least two polygonal surfaces and the inner surface of an inner roller, so that power transmission stability is ensured and it is possible to prevent driving force from being concentrated on one point, contact pressure from being increased, and two component elements from being brought into contact over their entire surfaces to generate excessively large frictional force, and in which portions implementing limited relative movement can be reliably lubricated using the straight portions of the polyhedral trunnion to decrease frictional force, suppress axial force generation, reduce vibration of a vehicle, and improve durability of the vehicle.

BACKGROUND OF THE INVENTION

As generally known in the art, a joint functions to transmit rotational power (torque) between two rotation shafts which meet each other at an angle. In the case of a propeller shaft having a small power transmission angle, a hook joint, a flexible joint, etc. are used, and in the case of the driving shaft of a front wheel drive vehicle having a large power transmission angle, a constant velocity joint is used.

Because the constant velocity joint can reliably transmit power at a constant velocity even when an angle between a driving shaft and a driven shaft is large, the constant velocity joint is mainly used for the axle shaft of an independent suspension type front wheel drive vehicle. When viewed from a shaft, a tripod type constant velocity joint is provided to one end of the shaft which faces an engine, and a Birfield type constant velocity joint is provided to the other end of the shaft which faces a tire.

FIG. 1 is a cross-sectional view illustrating conventional constant velocity joints, and FIG. 2 is a cross-sectional view taken along the line A-A of FIG. 1. Referring to FIGS. 1 and 2, the conventional constant velocity joints comprise a tripod type constant velocity joint which is provided to the right end of a shaft 1 (which faces an engine) and a Birfield type constant velocity joint provided to the left end of the shaft 1 (which faces a tire).

The tripod type constant velocity joint installed on the right end of the shaft 1 (which faces the engine) comprises a housing 2 which transmits rotational power of the engine (not shown) and is defined with track grooves on the inner surface thereof, the shaft 1 which receives the rotational power from the housing 2 and rotates, a spider 3 which is disposed in the housing 2, is coupled to one end of the shaft 1 to connect the housing 2 and the shaft 1 with each other and is formed with three trunnions to be respectively inserted into the track grooves of the housing 2, needle rollers 6 which are arranged on the circumferential outer surface of each trunnion of the spider 3, inner rollers 5 each of which is arranged around the needle rollers 6 for each trunnion of the spider 3, outer rollers 4 each of which is installed on the circumferential outer surface of each inner roller 5 to reduce friction between the housing 2 and the shaft 1, a retainer ring 8 which is installed on the upper ends of the needle rollers 6 and of each inner roller 5, a boot 10 having one end which is connected to the housing 2 and the other end which is connected to the shaft 1, and clamping bands 11 and 12 which clamp both ends of the boot 10.

The Birfield type constant velocity joint installed on the left end of the shaft 1 (which faces the tire) comprises an inner race 15 which is installed on the left end of the shaft 1 to receive the rotational power from the tripod type constant velocity joint and to then rotate, an outer race 13 which is installed around the inner race 15, balls 16 for transmitting the rotational power of the inner race 15 to the outer race 13, a cage 14 for supporting the balls 16, a sensor ring 17 which is installed around the outer race 13, a boot 18 having one end which is connected to the shaft 1 and the other end which is connected to the outer race 13, and clamping bands 19 and 20 which clamp both ends of the boot 18.

Hereafter, the operation of the conventional constant velocity joints constructed as mentioned above will be described.

As the rotational power outputted from the engine is transmitted to the housing 2 through a transmission, the housing 2 is rotated. The rotational power of the housing 2 is transmitted to the spider 3 through the outer rollers 4, the inner rollers 5 and the needle rollers 6, and then the shaft 1 to which the spider 3 is coupled is rotated. The rotational power of the shaft 1 is transmitted to the outer race 13 through the inner race 15 and the balls 16, and then the wheel (not shown) connected to the outer race 13 is rotated.

In the tripod type constant velocity joint which is provided to the right end of the shaft 1 (which faces the engine), as the outer rollers 4 slide in the track grooves of the housing 2, the rotation angle of the shaft 1 which is operationally associated with the outer rollers 4 is changed to follow the movement of a vehicle. In the Birfield type constant velocity joint which is provided to the left end of the shaft 1 (which faces the tire), the rotation angle of the outer race 13 is changed due to the presence of the balls 16 to follow the movement of the vehicle.

The boot 10 of the tripod type constant velocity joint and the boot 18 of the Birfield type constant velocity joint respectively function to enclose the tripod type constant velocity joint and the Birfield type constant velocity joint, so that the tripod type constant velocity joint and the Birfield type constant velocity joint are prevented from being contaminated by foreign substances.

FIG. 3 is a cross-sectional view illustrating another conventional tripod type constant velocity joint which has a different construction from the tripod type constant velocity joint shown in FIG. 1 Referring to FIG. 3, another conventional tripod type constant velocity joint comprises a housing 2' which is defined with three track grooves each having an optionally contoured guide surface, a spider 3' which is projectedly formed with three spherical trunnions 3a to be respectively inserted into the track grooves of the housing 2', inner rollers 5' each of which is installed to surround each spherical trunnion 3a, with the surface thereof to be brought into contact with the spherical trunnion 3a having a concave contour, a plurality of needle rollers 6' which are arranged around each inner roller 5', outer rollers 4' each of which is rotated by the medium of the needle rollers 6', and a retainer ring 8' which is installed to prevent the needle rollers 6' from being released.

The operation of the conventional tripod type constant velocity joint constructed as just mentioned above will be described below.

As power is transmitted to the housing 2' and the housing 2' is rotated, the power is transmitted to the trunnions 3a through the outer rollers 4', the needle rollers 6' and the inner rollers 5' to rotate the spider 3'. At this time, the combination of the inner roller 5' and the outer roller 4', which are operationally connected with each other through the needle rollers 6' and are rotated relative to each other, is guided along the guide surface of the housing 2' in the axial direction of the track groove of the housing 2'. Self-aligning movement (center-adjusting oscillation) occurs between the concave contour of the inner roller 5' and the spherical trunnion 3a.

However, in the case that the self-aligning movement occurs to absorb and correct the tilt of the spider 3' via the spherical trunnions 3a, as can be readily seen from FIGS. 4 and 5, since the contact area between the concave contour of the inner roller 5' and the spherical trunnion 3a, which are moved relative to each other, is substantial, frictional force generated therebetween increases. Also, because the relative movement decreases at the point 3c where the axis 3d of the self-aligning movement and the outer surface of the spherical trunnion 3a meet with each other, if the corresponding component elements are continuously rotated while receiving a load, insufficient lubrication can result and the rotational durability of the constant velocity joint can be degraded.

FIG. 6 is a transverse cross-sectional view illustrating still another conventional tripod type constant velocity joint, and FIG. 7 is a cross-sectional view taken along the line I-I of FIG. 6 Referring to FIGS. 6 and 7, still another conventional tripod type constant velocity joint comprises a housing 2" which is defined with three track grooves each having an optionally contoured guide surface, a spider 3" which is projectedly formed with three elliptical trunnions 3e to be respectively inserted into the track grooves of the housing 2", inner rollers 5" each of which is installed to surround each elliptical trunnion 3e, with the surface thereof to be brought into contact with the elliptical trunnion 3e having a convex contour, a plurality of needle rollers 6" which are arranged around each inner roller 5", outer rollers 4" each of which is rotated by the medium of the needle rollers 6", and a retainer ring 8" which is installed to prevent the needle rollers 6" and the inner rollers 5" from being released.

The operation of the conventional tripod type constant velocity joint constructed as just mentioned above will be described below.

As power is transmitted to the housing 2" and the housing 2" is rotated, the power is transmitted to the elliptical trunnions 3e through the outer rollers 4", the needle rollers 6" and the inner rollers 5" to rotate the spider 3". At this time, the combination of the inner roller 5" and the outer roller 4", which are operationally connected with each other through the needle rollers 6" and are rotated relative to each other, is guided along the guide surface of the housing 2" in the axial direction of the track groove of the housing 2". Self-aligning movement (center-adjusting oscillation) occurs between the convex contour of the inner roller 5" and the elliptical trunnion 3e.

However, when the elliptical trunnion 3e and the convex contour of the inner roller 5" are operationally connected with each other, as can be readily seen from FIGS. 7 and 8, since the elliptical trunnion 3e and the convex contour of the inner roller 5" are brought into contact with each other on one point 3f to transmit power, a problem is caused in that surface pressure increases and the durability of the constant velocity joint is deteriorated. Also, because power is transmitted through point contact, the outer roller 4" cannot be held parallel in the track groove of the housing 2", whereby power transmission stability cannot be ensured and the effect of suppressing the creation of additional force components by driving force cannot be guaranteed.

SUMMARY OF THE INVENTION

Accordingly, the present invention has been made to solve the above-mentioned problems occurring in the prior art, and an object of the present invention is to provide a tripod type constant velocity joint which can form a plurality of contact parts between a polyhedral trunnion having at least two polygonal surfaces and the inner surface of an inner roller, so that power transmission stability is ensured and it is possible to prevent driving force from being concentrated on one point, contact pressure from being increased, and two component elements from being brought into contact over their entire surfaces to generate excessively large frictional force.

Another object of the present invention is to provide a tripod type constant velocity joint in which portions implementing limited relative movement can be reliably lubricated using the straight portions of a polyhedral trunnion to decrease frictional force, suppress axial force generation, reduce vibration of a vehicle, and improve durability of the vehicle.

In order to achieve the above objects, according to one aspect of the present invention, there is provided a tripod type constant velocity joint comprising a housing having three track grooves which are defined at trisected positions of the housing along a circumferential direction and extend in a radial direction; a spider having three polyhedral trunnions which are projectedly formed at trisected positions of the spider along the circumferential direction to be respectively inserted into the track grooves of the housing and each of which has at least two polygonal surfaces at each of two opposing sides subjecting to a load; inner rollers a circumferential inner surface of each of which has a curved contour for surrounding the polyhedral trunnion; a plurality of needle rollers assembled to a circumferential outer surface of each inner roller; and outer rollers each formed to be rotated through the needle rollers, to be moved in an axial direction of the inner roller, and to be moved in an axial direction of the track groove along a guide surface of the housing.

In order to achieve the above objects, according to another aspect of the present invention, there is provided a tripod type constant velocity joint comprising a housing having three track grooves which are defined at trisected positions of the housing along a circumferential direction and extend in a radial direction; a spider having three polyhedral trunnions which are projectedly formed at trisected positions of the spider along the circumferential direction to be respectively inserted into the track grooves of the housing and each of which has at least two independent contact points or contact surfaces on each side and at least four independent contact points or contact surfaces on both sides; inner rollers a circumferential inner surface of each of which has a curved contour for surrounding the polyhedral trunnion; a plurality of needle rollers assembled to a circumferential outer surface of each inner roller; and outer rollers each formed to be rotated through the needle rollers, to be moved in an axial direction of the inner roller, and to be moved in an axial direction of the track groove along a guide surface of the housing.

In order to achieve the above objects, according to another aspect of the present invention, there is provided a tripod type constant velocity joint comprising a housing having three track grooves which are defined at trisected positions of the housing along a circumferential direction and extend in a radial direction; a spider having three polyhedral trunnions which are projectedly formed at trisected positions of the spider along the circumferential direction to be respectively inserted into the track grooves of the housing and each of which has at least four surfaces such that at least one independent contact surface is positioned on each side; inner rollers a circumferential inner surface of each of which has a curved contour for surrounding the polyhedral trunnion; a plurality of needle rollers assembled to a circumferential outer surface of each inner roller; outer rollers each formed to be rotated through the needle rollers, to be moved in an axial direction of the inner roller, and to be moved in an axial direction of the track groove along a guide surface of the housing; and retainers each installed to prevent the inner roller from being released.

According to another aspect of the present invention, vertexes on each trunnion are grinded as optional rounded surfaces such that a circumferential inner surface of each inner roller and the grinded portions of each trunnion are brought into surface contact with each other at various positions.

According to another aspect of the present invention, a non-contact corner portion is formed on the trunnion between contact parts so that lubricant can be reliably provided to portions which implement limited relative movement.

According to another aspect of the present invention, the tripod type constant velocity joint further comprises retainer rings and retainer clips installed such that they are spaced apart from the needle rollers and the outer rollers by a distance which allows the needle rollers and the outer rollers to be sufficiently moved in an axial direction, to prevent the needle rollers and the outer rollers from being released.

According to another aspect of the present invention, a retainer portion for preventing release of the needle rollers and the inner roller is integrally formed on one end of the circumferential outer surface of each inner roller; and a retainer ring and a retainer clip are mounted to the other end of the circumferential outer surface of each inner roller such that they are spaced apart from the needle rollers and the inner roller by a distance which allows the needle rollers and the inner roller to be sufficiently moved in an axial direction of the outer roller.

According to another aspect of the present invention, a width $L_1$ of the outer roller and a length $L_2$ of the needle roller have a relationship expressed by $L_1 > L_2/2$.

According to another aspect of the present invention, the width $L_1$ of the outer roller and a distance $L_3$ through which the outer roller can be moved in the axial direction of the inner roller have a relationship expressed by $L_1 > L_3/2$.

According to another aspect of the present invention, a retainer portion for preventing release of the needle rollers and the inner roller is integrally formed on one end of a circumferential inner surface of each outer roller; and wherein a retainer ring and a retainer clip are mounted to the other end of the circumferential inner surface of each outer roller such that they are spaced apart from the needle rollers and the inner roller by a distance which allows the needle rollers and the inner roller to be sufficiently moved in an axial direction of the outer roller.

According to another aspect of the present invention, a width $L_4$ of the inner roller and a length $L_5$ of the needle roller have a relationship expressed by $L_4 > L_5/2$.

According to another aspect of the present invention, the width $L_4$ of the inner roller and a distance $L_6$ through which the inner roller can be moved in the axial direction of the outer roller have a relationship expressed by $L_4 > L_6/2$.

According to another aspect of the present invention, a continuous contact surface is located along a corner portion of an optional surface.

According to still another aspect of the present invention, at least two non-continuous contact surfaces are located along a corner portion of an optional surface.

According to yet still another aspect of the present invention, at least one corner portion of corner portions of a contact surface is maintained as a non-contact part such that a gap is created between the non-contact part and the circumferential inner surface of the inner roller.

BRIEF DESCRIPTION OF THE DRAWINGS

The above and other objects, features and advantages of the present invention will be more apparent from the following detailed description when taken in conjunction with the accompanying drawings, in which:

FIG. 5 is a transverse cross-sectional view of FIG. 3a;

DETAILED DESCRIPTION OF THE INVENTION

Figure 1:
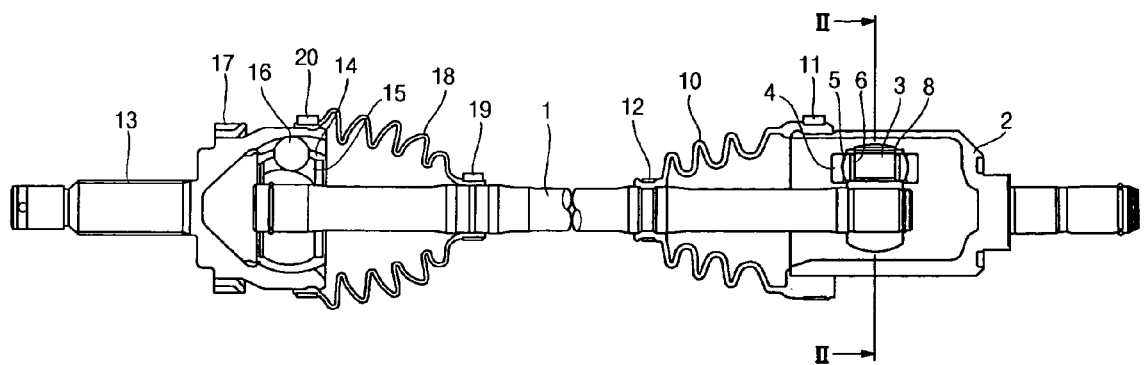
FIG. 1 is a cross-sectional view illustrating conventional constant velocity joints.
Figure 2:
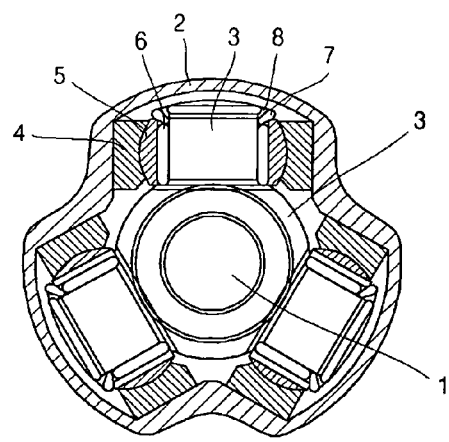
FIG. 2 is a cross-sectional view taken along the line A-A of FIG. 1.
Figure 3:
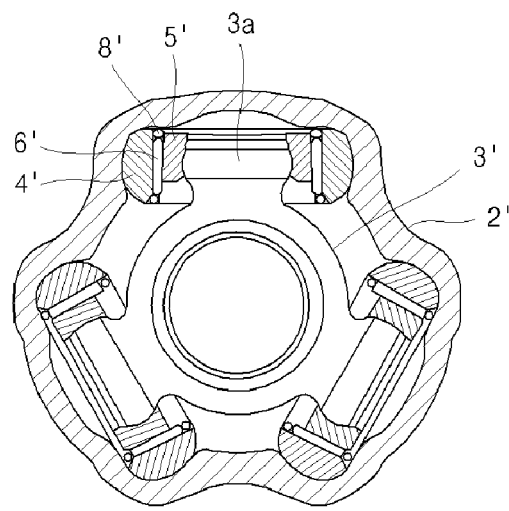
FIG. 3 is a cross-sectional view illustrating another conventional tripod type constant velocity joint.
Figure 4:
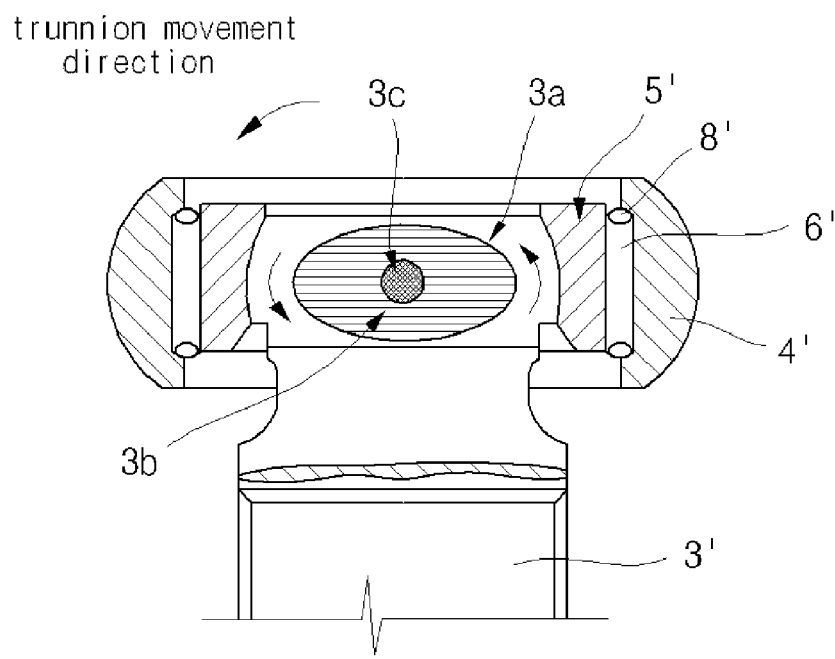
FIG. 4 is a cross-sectional view for explaining contact areas and relative movement in the conventional tripod type constant velocity joint shown in FIG. 2.
Figure 5:
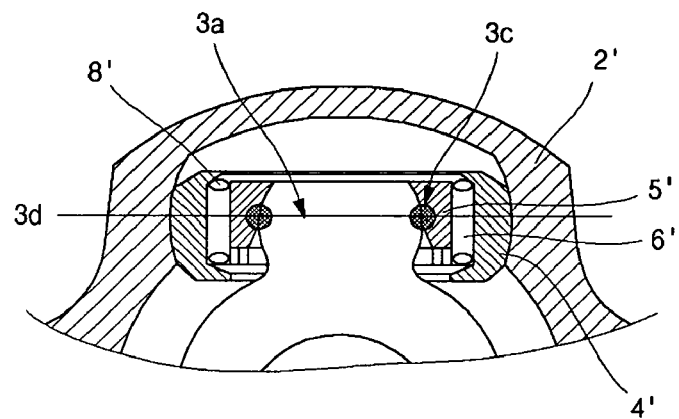
Figure 6:
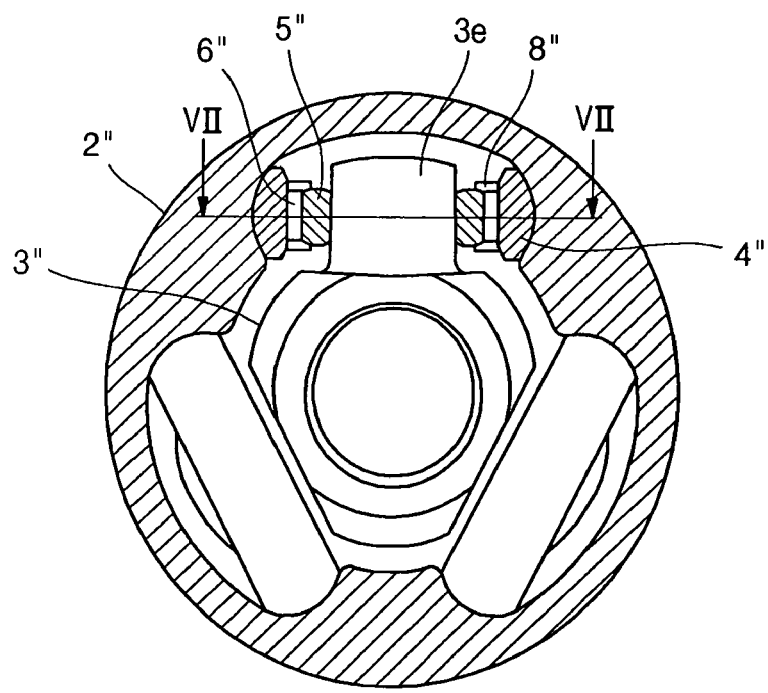
FIG. 6 is a transverse cross-sectional view illustrating still another conventional tripod type constant velocity joint.
Figure 7:
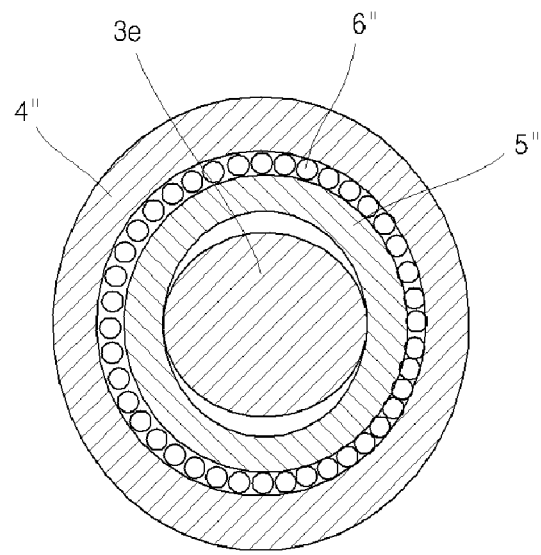
FIG. 7 is a cross-sectional view taken along the line I-I of FIG. 6.
Figure 8:
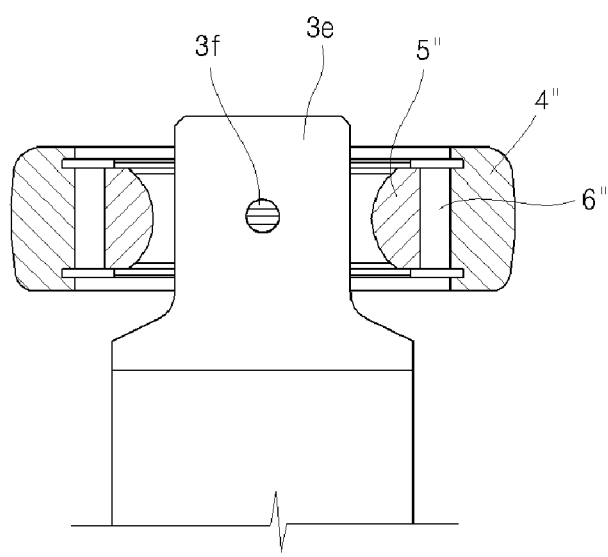
FIGS. 8 and 9 are longitudinal cross-sectional views for explaining contact areas and relative movement in the conventional tripod type constant velocity joint shown in FIGS. 6 and 7.
Figure 9:
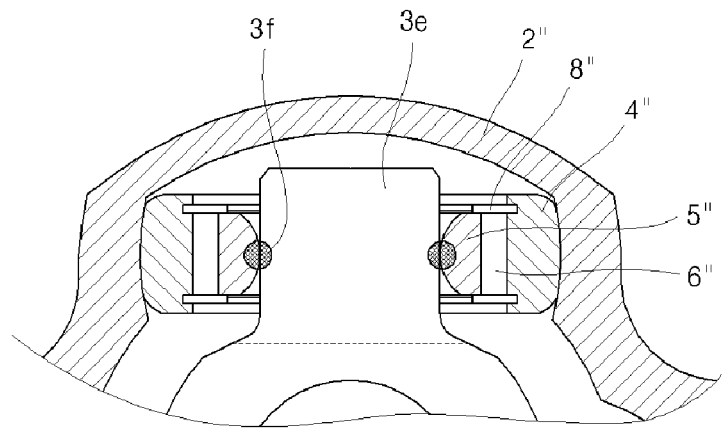

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 10:
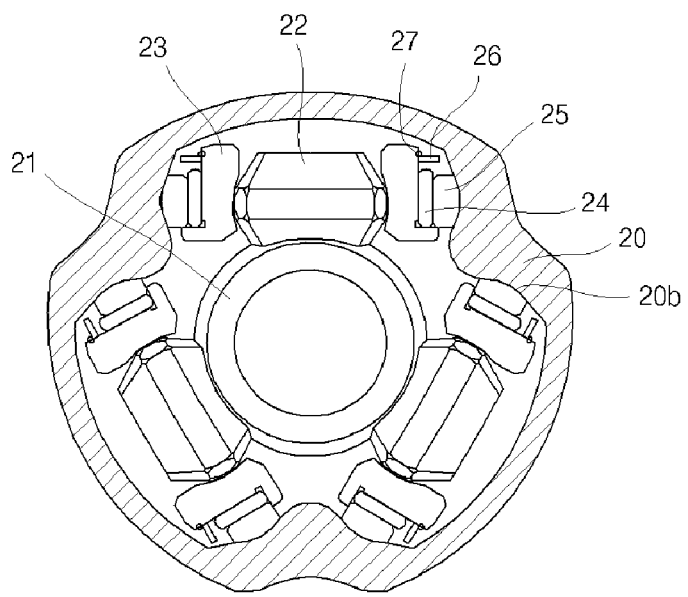
FIG. 10 is a cross-sectional view illustrating a tripod type constant velocity joint in accordance with a first embodiment of the present invention.
Figure 11:
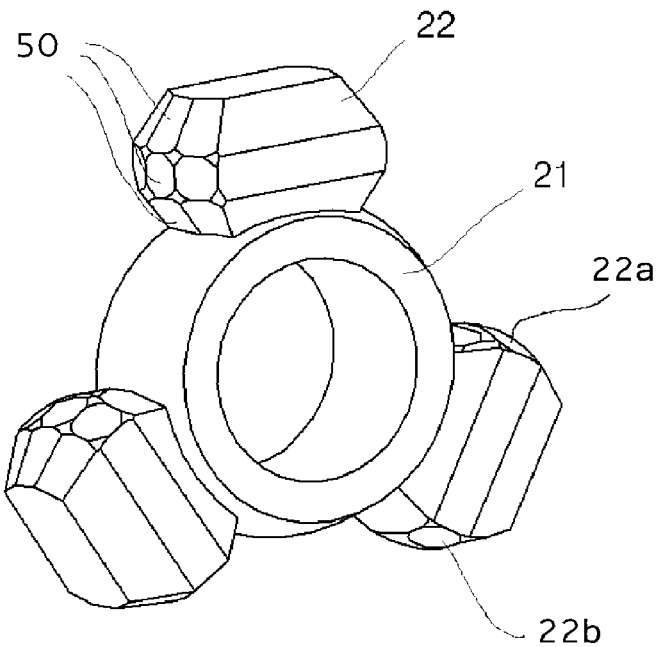
FIG. 11 is a perspective view illustrating the spider of the tripod type constant velocity joint in accordance with the first embodiment of the present invention.
Figure 12:
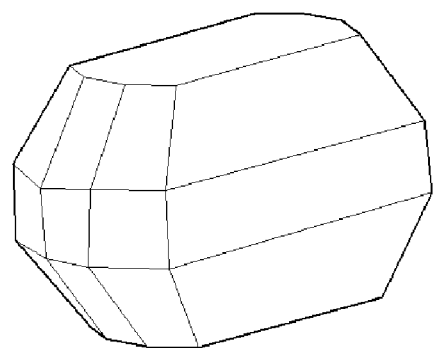
FIGS. 12 through 16 are perspective views illustrating other configurations of the trunnion of the tripod type constant velocity joint in accordance with the first embodiment of the present invention.
Figure 13:
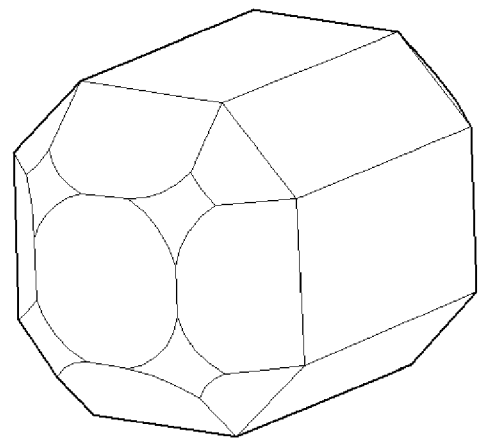
Figure 14:
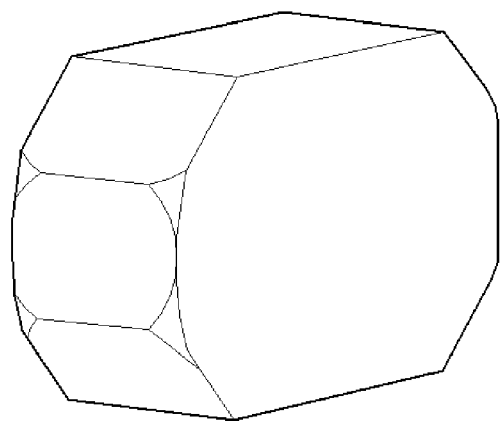
Figure 15:
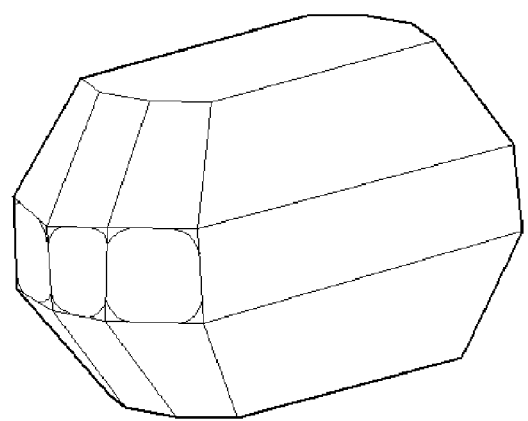
Figure 16:
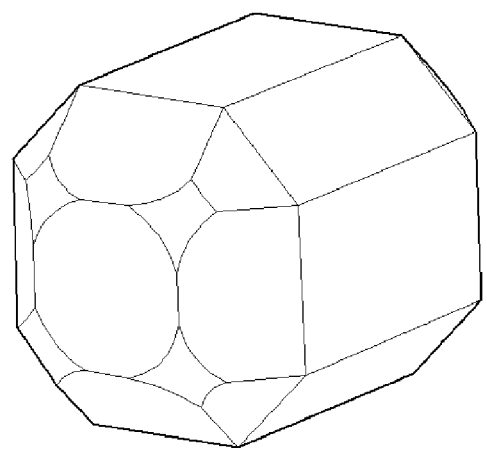

FIG. 10 is a cross-sectional view illustrating a tripod type constant velocity joint in accordance with a first embodiment of the present invention, and FIG. 11 is a perspective view illustrating the spider of the tripod type constant velocity joint in accordance with the first embodiment of the present invention.

Referring to FIGS. 10 and 11, the tripod type constant velocity joint in accordance with the first embodiment of the present invention comprises a housing 20 having three track grooves 20b which are defined at trisected positions of the housing 20 along the circumferential direction and extend in the radial direction, a spider 21 having three polyhedral trunnions 22 which are projectedly formed at trisected positions of the spider 21 along the circumferential direction to be respectively inserted into the track grooves 20b of the housing 20 and each of which has at least two polygonal surfaces 50 in each of two opposite sides 22a and 22b subjecting to a load, inner rollers 23 the circumferential inner surface of each of which has a curved contour for surrounding the polyhedral trunnion 22, a plurality of needle rollers 24 assembled to the circumferential outer surface of each inner roller 23, and outer rollers 25 each formed to be rotated through the needle rollers 24, to be moved in the axial direction of the inner roller 23, and to be moved in the axial direction of the track groove 20b along the guide surface of the housing 20.

The circumferential inner surface of the inner roller 23 defines a substantially spherical space. A retainer ring 26 and a retainer clip 27 are mounted to one end of the circumferential outer surface of each inner roller 23 such that they are spaced apart from the needle rollers 24 and the outer roller 25 by a distance which allows the needle rollers 24 and the outer roller 25 to be sufficiently moved in the axial direction of the inner roller 23.

FIGS. 12 through 16 are perspective views illustrating other configurations of the trunnion of the tripod type constant velocity joint in accordance with the first embodiment of the present invention.

Figure 17:
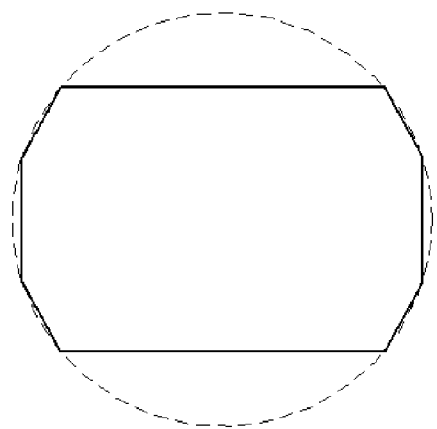
FIGS. 17 through 19 are views illustrating contact patterns between the trunnion and the inner roller of the tripod type constant velocity joint in accordance with the first embodiment of the present invention.
Figure 18:
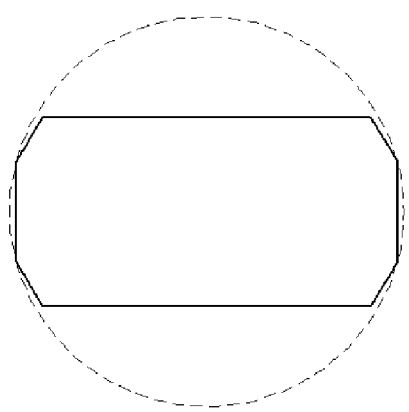

As can be readily seen from the drawings, due to the fact that the outer surface of the polyhedral trunnion 22 constituting the tripod type constant velocity joint in accordance with the first embodiment of the present invention is formed by a combination of at least four surfaces, the polyhedral trunnion 22 has a configuration which can be brought into contact with the circumferential inner surface of the inner roller 23 at various positions. In this regard, referring to FIG. 17, the trunnion can be formed as a polyhedron which is inscribed in a circle to be brought into point contact with the circle at various positions. Referring to FIG. 18, the trunnion can be formed as a polyhedron in which only the vertexes of the polyhedron serving as power transmitting parts are inscribed in a circle to allow the polyhedron to be brought into point contact with the circle at various positions. Also, referring to FIG. 19, the trunnion can be formed as a polyhedron of which vertexes are grinded to have rounded surfaces to allow the polyhedron to be brought into surface contact with the circumferential inner surface of the inner roller 23 at various positions.

Figure 20:
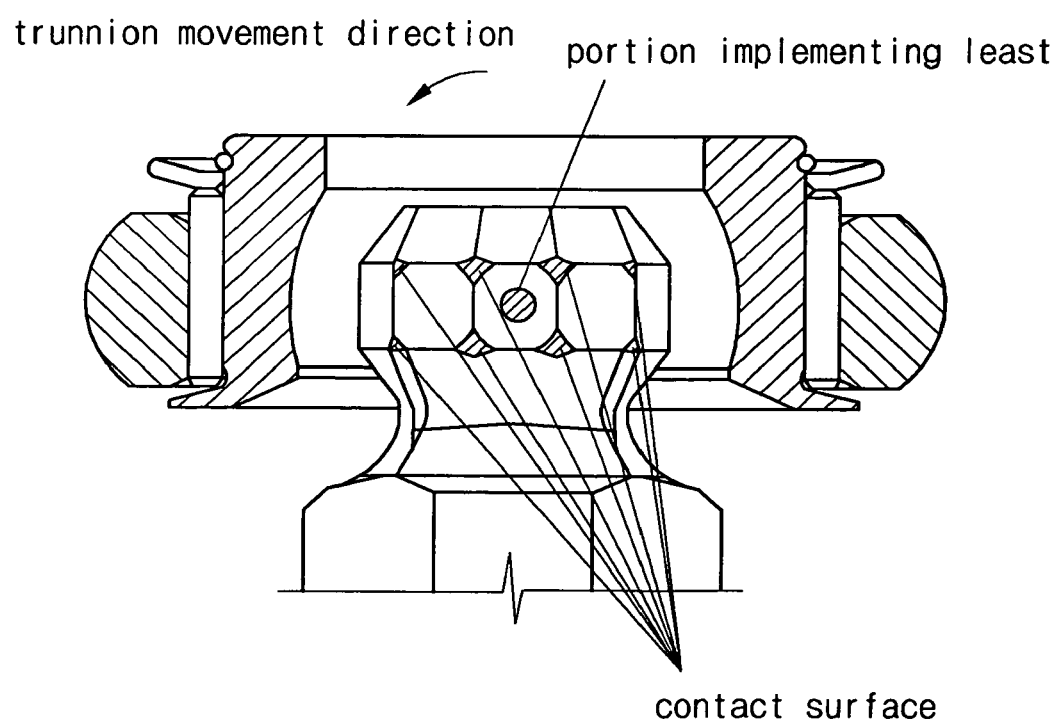
FIG. 20 is a cross-sectional view illustrating stress distribution in the tripod type constant velocity joint in accordance with the first embodiment of the present invention.

Due to the fact that the polyhedral trunnion 22 is used as described above, as can be readily seen from FIG. 20, since a plurality of contact parts can be formed between the polyhedron trunnion 22 and the circumferential inner surface of the inner roller 23, power transmission stability is ensured, and it is possible to prevent driving force from being concentrated on one point, contact pressure from being increased, and two component elements from being brought into contact over their entire surfaces to generate excessively large frictional force.

Figure 21:
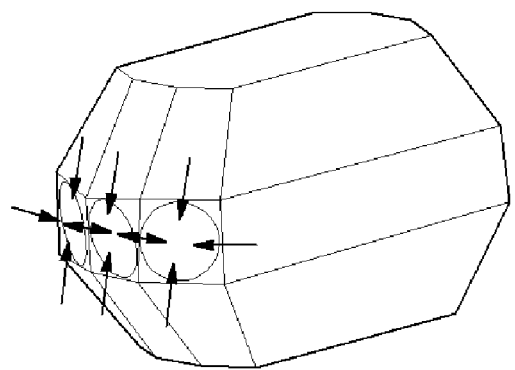
FIGS. 21 and 22 are perspective views illustrating paths through which lubricant can flow on the trunnion of the tripod type constant velocity joint in accordance with the first embodiment of the present invention.
Figure 22:
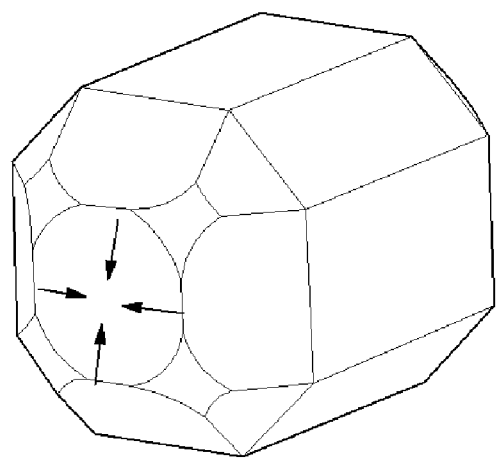

Also, due to the fact that the polyhedral trunnion 22 is used as described above, as can be readily seen from FIGS. 21 and 22, since non-contact corner portions are defined between the contact parts as indicated by the arrows so that lubricant can be reliably provided to the portions implementing limited relative movement, it is possible to prevent durability of the constant velocity joint from being deteriorated due to insufficient lubrication.

Figure 23:
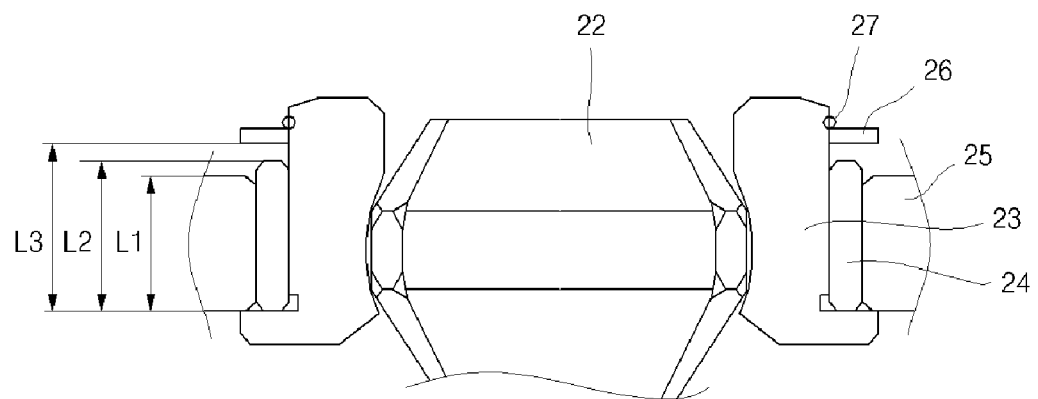
FIG. 23 is a cross-sectional view illustrating size relationships in a roller assembly of the tripod type constant velocity joint in accordance with the first embodiment of the present invention.

FIG. 23 is a cross-sectional view illustrating size relationships in a roller assembly of the tripod type constant velocity joint in accordance with the first embodiment of the present invention. Referring to FIG. 23, in the roller assembly of the tripod type constant velocity joint in accordance with the first embodiment of the present invention, a retainer portion for preventing release of the needle rollers 24 and the inner roller 23 is integrally formed on one end of the circumferential outer surface of each inner roller 23. Further, a retainer ring 26 and a retainer clip 27 are mounted to the other end of the circumferential outer surface of each inner roller 23 such that they are spaced apart from the needle rollers 24 and the outer roller 25 by a distance which allows the needle rollers 24 and the outer roller 25 to be sufficiently moved in the axial direction of the outer roller 25.

In this case, it is preferred that the width $L_1$ of the outer roller 25 and the length $L_2$ of the needle roller 24 have a relationship expressed by $L_1 > L_2/2$, and the width $L_1$ of the outer roller 25 and the distance $L_3$ through which the outer roller 25 can be moved in the axial direction of the inner roller 23 have a relationship expressed by $L_1 > L_3/2$. The roller assembly (composed of the inner roller 23, the outer roller 25, the needle rollers 24, the retainer ring 26 and the retainer clip 27) constructed in this way is prevented from being unintentionally disassembled. The roller assembly can be easily handled and assembled.

Figure 24:
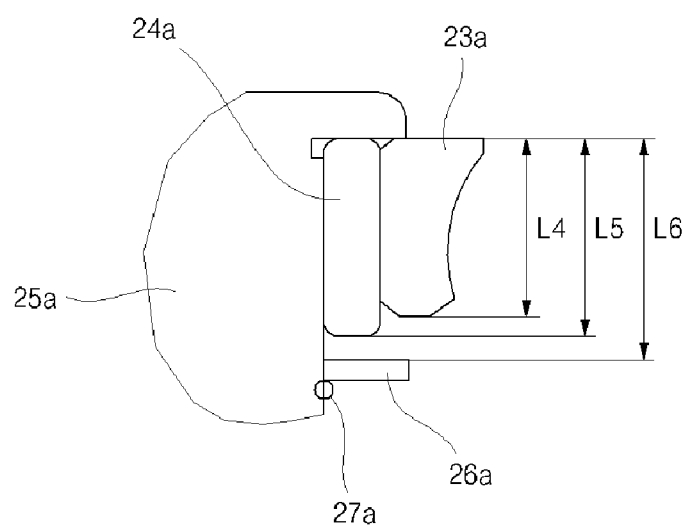
FIG. 24 is a cross-sectional view illustrating size relationships in another roller assembly of the tripod type constant velocity joint in accordance with the first embodiment of the present invention.

FIG. 24 is a cross-sectional view illustrating size relationships in another roller assembly of the tripod type constant velocity joint in accordance with the first embodiment of the present invention. Referring to FIG. 24, in another roller assembly of the tripod type constant velocity joint in accordance with the first embodiment of the present invention, a retainer portion for preventing release of the needle rollers 24a and the inner roller 23a is integrally formed on one end of the circumferential inner surface of each outer roller 25a. Further, a retainer ring 26a and a retainer clip 27a are mounted to the other end of the circumferential inner surface of each outer roller 25a such that they are spaced apart from the needle rollers 24a and the inner roller 23a by a distance which allows the needle rollers 24a and the inner roller 23a to be sufficiently moved in the axial direction of the outer roller 25a.

In this case, it is preferred that the width $L_4$ of the inner roller 23a and the length $L_5$ of the needle roller 24a have a relationship expressed by $L_4 > L_5/2$, and the width $L_4$ of the inner roller 23a and the distance $L_6$ through which the inner roller 23a can be moved in the axial direction of the outer roller 25a have a relationship expressed by $L_4 > L_6/2$. The roller assembly (composed of the inner roller 23a, the outer roller 25a, the needle rollers 24a, the retainer ring 26a and the retainer clip 27a) constructed in this way is prevented from being unintentionally disassembled. The roller assembly can be easily handled and assembled.

Figure 25:
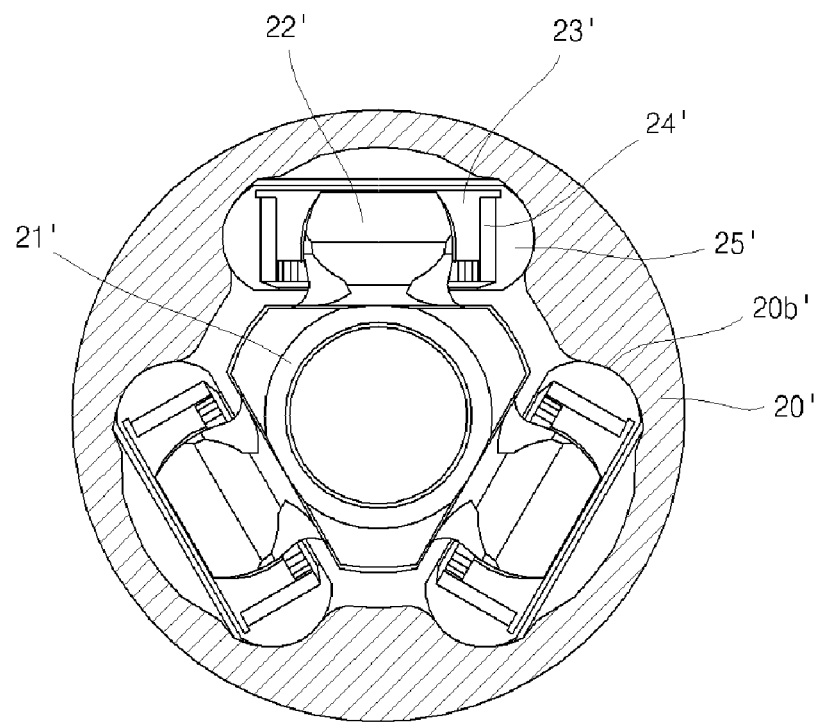
FIG. 25 is a cross-sectional view illustrating a tripod type constant velocity joint in accordance with a second embodiment of the present invention.
Figure 26:
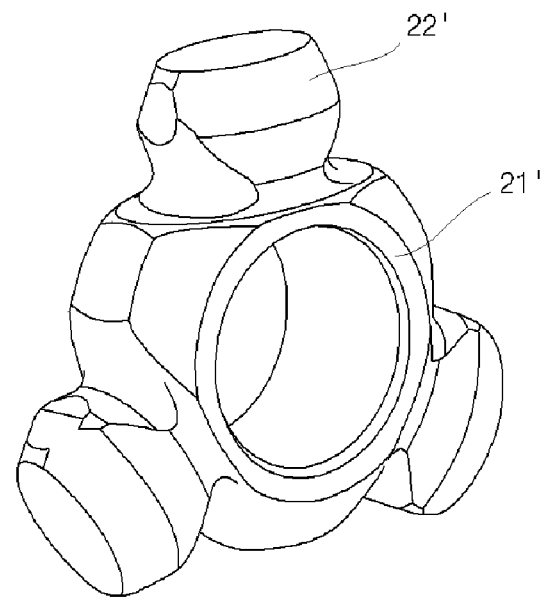
FIG. 26 is a perspective view illustrating the spider of the tripod type constant velocity joint in accordance with the second embodiment of the present invention.

FIG. 25 is a cross-sectional view illustrating a tripod type constant velocity joint in accordance with a second embodiment of the present invention, and FIG. 26 is a perspective view illustrating the spider of the tripod type constant velocity joint in accordance with the second embodiment of the present invention.

Referring to FIGS. 25 and 26, the tripod type constant velocity joint in accordance with the second embodiment of the present invention comprises a housing 20' having three track grooves 20b' which are defined at trisected positions of the housing 20' along the circumferential direction and extend in the radial direction, a spider 21' having three trunnions 22' of generally oval or elliptical cross-sectional shape which are projectedly formed at trisected positions of the spider 21' along the circumferential direction to be respectively inserted into the track grooves 20b' of the housing 20' and each of which has at least two independent contact points or contact surfaces on each side and at least four independent contact points or contact surfaces on both sides, inner rollers 23' the circumferential inner surface of each of which has a curved contour for surrounding the trunnion 22', a plurality of needle rollers 24' assembled to the circumferential outer surface of each inner roller 23', and outer rollers 25' each formed to be rotated through the needle rollers 24', to be moved in the axial direction of the inner roller 23', and to be moved in the axial direction of the track groove 20b' along the guide surface of the housing 20'.

Figure 27:
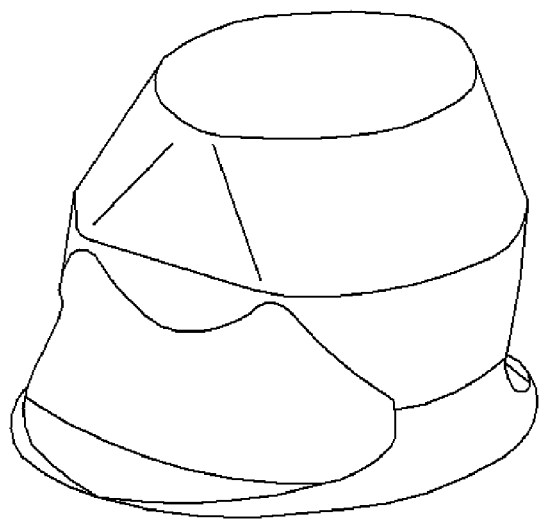
FIG. 27 is a perspective view illustrating another configuration of the trunnion of the tripod type constant velocity joint in accordance with the second embodiment of the present invention.

FIG. 27 is a perspective view illustrating another configuration of the trunnion of the tripod type constant velocity joint in accordance with the second embodiment of the present invention.

Figure 28:
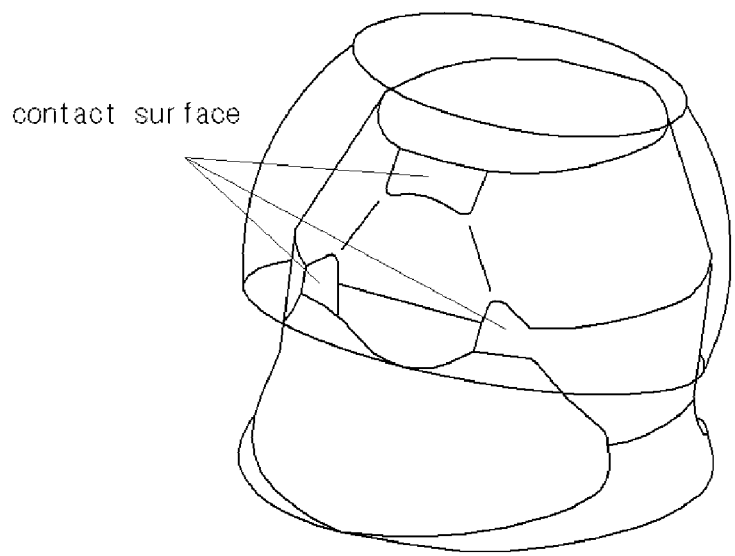
FIGS. 28 and 29 are views illustrating contact surfaces and contact points between the trunnion and the inner roller of the tripod type constant velocity joint in accordance with the second embodiment of the present invention.
Figure 29:
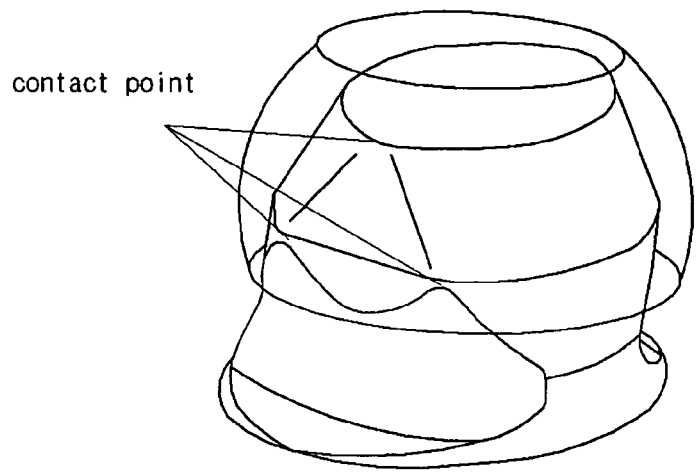

As can be readily seen from the drawings, due to the fact that the outer surface of the trunnion 22' of generally oval or elliptical shape constituting the tripod type constant velocity joint in accordance with the second embodiment of the present invention has at least two independent contact points or contact surfaces on each side and at least four independent contact points or contact surfaces on both sides, the trunnion 22' has a configuration which can be brought into contact with the circumferential inner surface of the inner roller 23' at various positions as shown in FIGS. 28 and 29.

Figure 30:
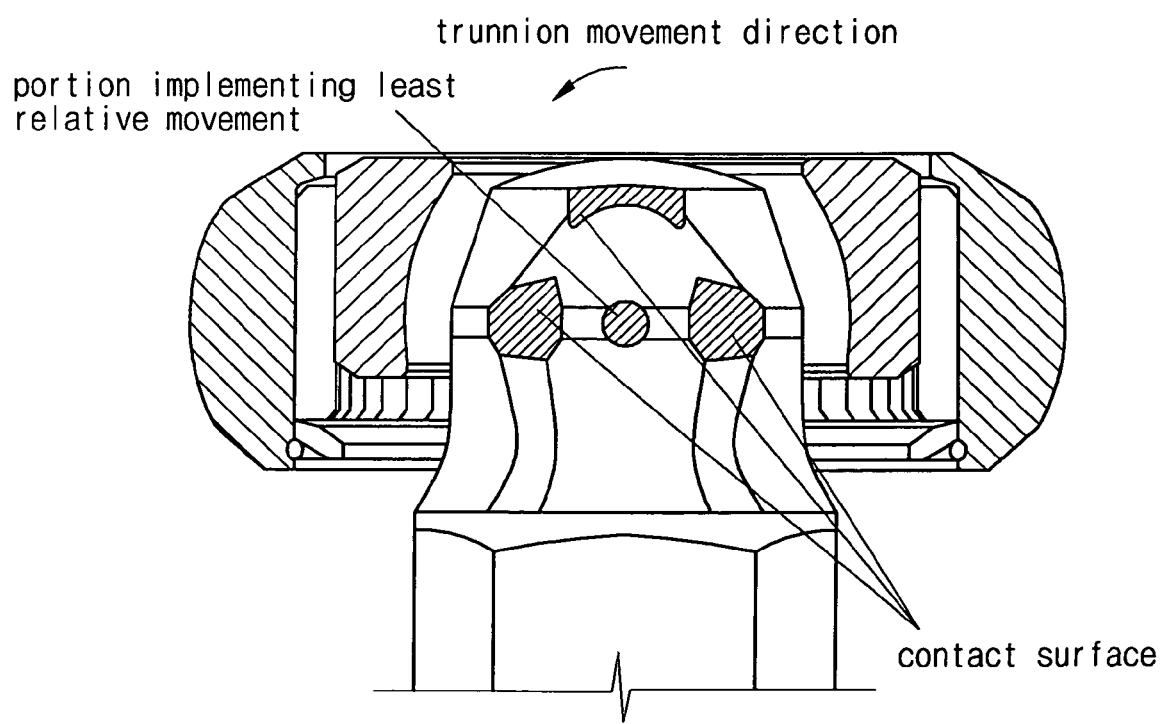
FIG. 30 is a cross-sectional view illustrating stress distribution in the tripod type constant velocity joint in accordance with the second embodiment of the present invention.

Due to the fact that the trunnion 22' is used as described above, as can be readily seen from FIG. 30, since a plurality of contact parts can be formed between the polyhedron trunnion 22' and the circumferential inner surface of the inner roller 23', power transmission stability is ensured, and it is possible to prevent driving force from being concentrated on one point, contact pressure from being increased, and two component elements from being brought into contact over their entire surfaces to generate excessively large frictional force.

Figure 31:
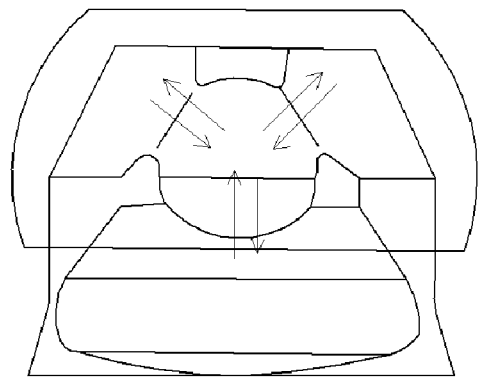
FIGS. 31 and 32 are perspective views illustrating paths through which lubricant can flow on the trunnion of the tripod type constant velocity joint in accordance with the second embodiment of the present invention.
Figure 32:
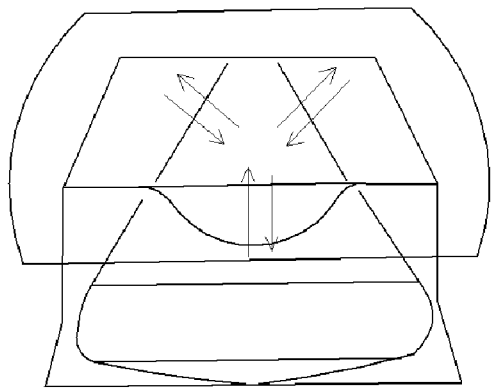

Also, due to the fact that the trunnion 22' is used as described above, as can be readily seen from FIGS. 31 and 32, since non-contact corner portions are defined between the contact parts as indicated by the arrows so that lubricant can be reliably provided to the portions implementing limited relative movement, it is possible to prevent durability of the constant velocity joint from being deteriorated due to insufficient lubrication.

Figure 33:
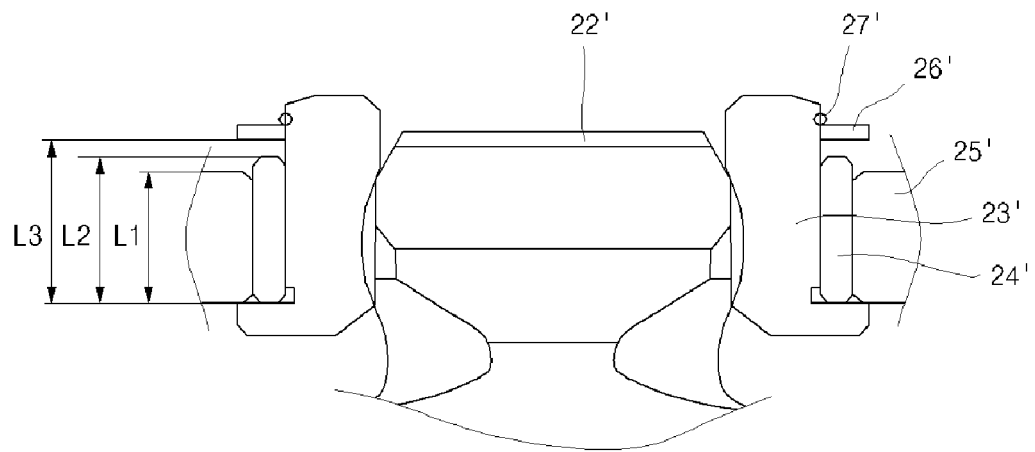
FIG. 33 is a cross-sectional view illustrating size relationships in a roller assembly of the tripod type constant velocity joint in accordance with the second embodiment of the present invention.

FIG. 33 is a cross-sectional view illustrating size relationships in a roller assembly of the tripod type constant velocity joint in accordance with the second embodiment of the present invention. Referring to FIG. 33, in the roller assembly of the tripod type constant velocity joint in accordance with the second embodiment of the present invention, a retainer portion for preventing release of the needle rollers 24' and the inner roller 23' is integrally formed on one end of the circumferential outer surface of each inner roller 23'. Further, a retainer ring 26' and a retainer clip 27' are mounted to the other end of the circumferential outer surface of each inner roller 23' such that they are spaced apart from the needle rollers 24' and the outer roller 25' by a distance which allows the needle rollers 24' and the outer roller 25' to be sufficiently moved in the axial direction of the outer roller 25'.

In this case, it is preferred that the width $L_1$ of the outer roller 25' and the length $L_2$ of the needle roller 24' have a relationship expressed by $L_1 > L_2/2$, and the width $L_1$ of the outer roller 25' and the distance $L_3$ through which the outer roller 25' can be moved in the axial direction of the inner roller 23' have a relationship expressed by $L_1 > L_3/2$. The roller assembly (composed of the inner roller 23', the outer roller 25', needle rollers 24', the retainer ring 26' and the retainer clip 27') constructed in this way is prevented from being unintentionally disassembled. The roller assembly can be easily handled and assembled.

Figure 19:
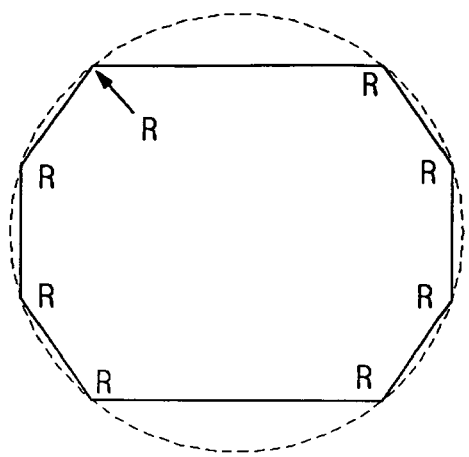
Figure 34:
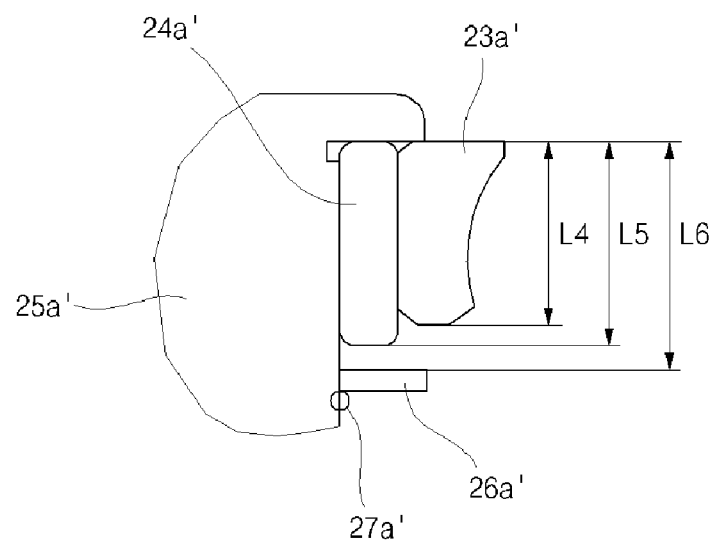
FIG. 34 is a cross-sectional view illustrating size relationships in another roller assembly of the tripod type constant velocity joint in accordance with the second embodiment of the present invention.

FIG. 34 is a cross-sectional view illustrating size relationships in another roller assembly of the tripod type constant velocity joint in accordance with the second embodiment of the present invention. Referring to FIG. 19, in another roller assembly of the tripod type constant velocity joint in accordance with the second embodiment of the present invention, a retainer portion for preventing release of the needle rollers 24a' and the inner roller 23a' is integrally formed on one end of the circumferential inner surface of each outer roller 25a'. Further, a retainer ring 26a' and a retainer clip 27a' are mounted to the other end of the circumferential inner surface of each outer roller 25a' such that they are spaced apart from the needle rollers 24a' and the inner roller 23a' by a distance which allows the needle rollers 24a' and the inner roller 23a' to be sufficiently moved in the axial direction of the outer roller 25a'.

In this case, it is preferred that the width $L_4$ of the inner roller 23a' and the length $L_5$ of the needle roller 24a' have a relationship expressed by $L_4 > L_5/2$, and the width $L_4$ of the inner roller 23a' and the distance $L_6$ through which the inner roller 23a' can be moved in the axial direction of the outer roller 25a' have a relationship expressed by $L_4 > L_6/2$. The roller assembly (composed of the inner roller 23a', the outer roller 25a', the needle rollers 24a', the retainer ring 26a' and the retainer clip 27a') constructed in this way is prevented from being unintentionally disassembled. The roller assembly can be easily handled and assembled.

Figure 35:
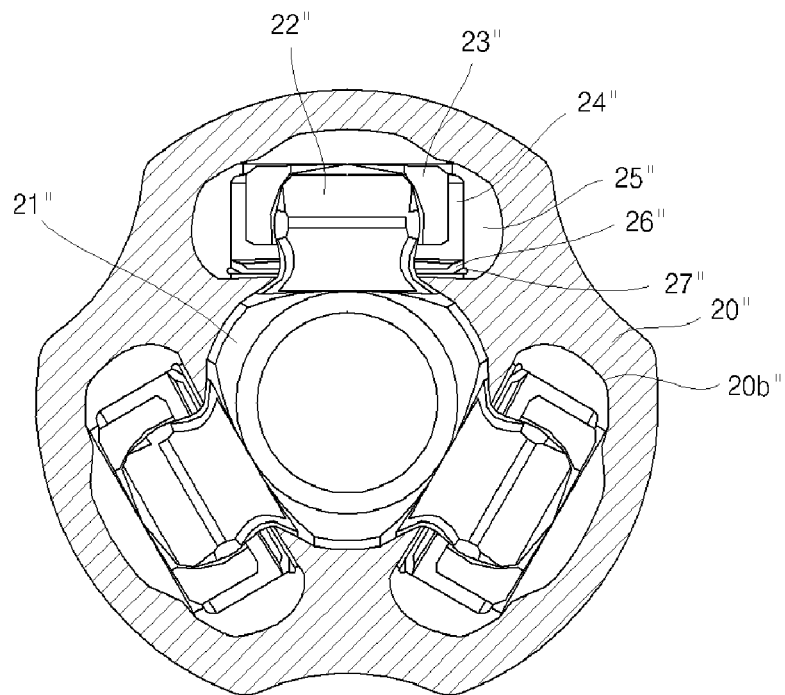
FIG. 35 is a cross-sectional view illustrating a tripod type constant velocity joint in accordance with a third embodiment of the present invention.
Figure 36:
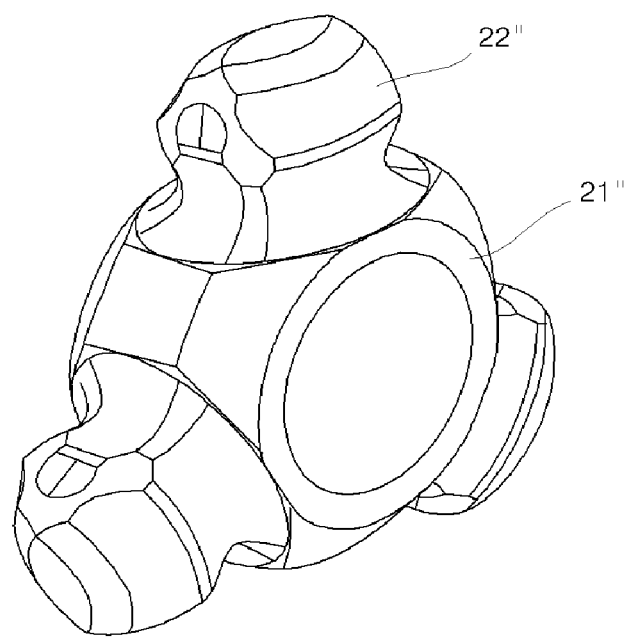
FIG. 36 is a perspective view illustrating the spider of the tripod type constant velocity joint in accordance with the third embodiment of the present invention.

FIG. 35 is a cross-sectional view illustrating a tripod type constant velocity joint in accordance with a third embodiment of the present invention, and FIG. 36 is a perspective view illustrating the spider of the tripod type constant velocity joint in accordance with the third embodiment of the present invention.

Referring to FIGS. 35 and 36, the tripod type constant velocity joint in accordance with the third embodiment of the present invention comprises a housing 20" having three track grooves 20b" which are defined at trisected positions of the housing 20" along the circumferential direction and extend in the radial direction, a spider 21" having three trunnions 22" of generally oval or elliptical cross-sectional shape which are projectedly formed at trisected positions of the spider 21" along the circumferential direction to be respectively inserted into the track grooves 20b" of the housing 20" and each of which has at least four surfaces such that at least one independent contact surface is positioned on each side, inner rollers 23" the circumferential inner surface of each of which has a curved contour for surrounding the trunnion 22", a plurality of needle rollers 24" assembled to the circumferential outer surface of each inner roller 23", outer rollers 25" each formed to be rotated through the needle rollers 24", to be moved in the axial direction of the inner roller 23", and to be moved in the axial direction of the track groove 20b" along the guide surface of the housing 20", and retainers 26" and retainer clips 27" installed to prevent the inner rollers 23" from being released.

Figure 37:
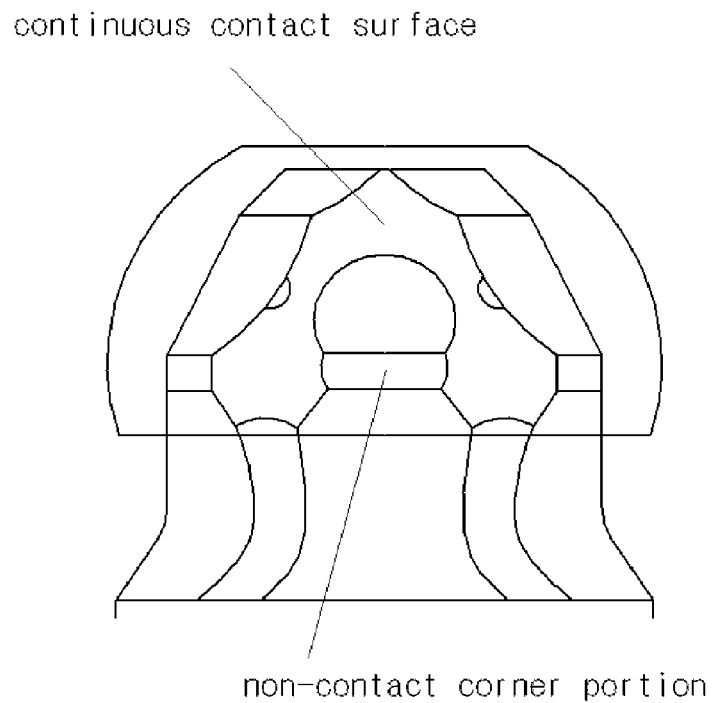
FIGS. 37 and 38 are views illustrating contact surfaces and non-contact corner portions between the trunnion and the inner roller of the tripod type constant velocity joint in accordance with the third embodiment of the present invention.
Figure 38:
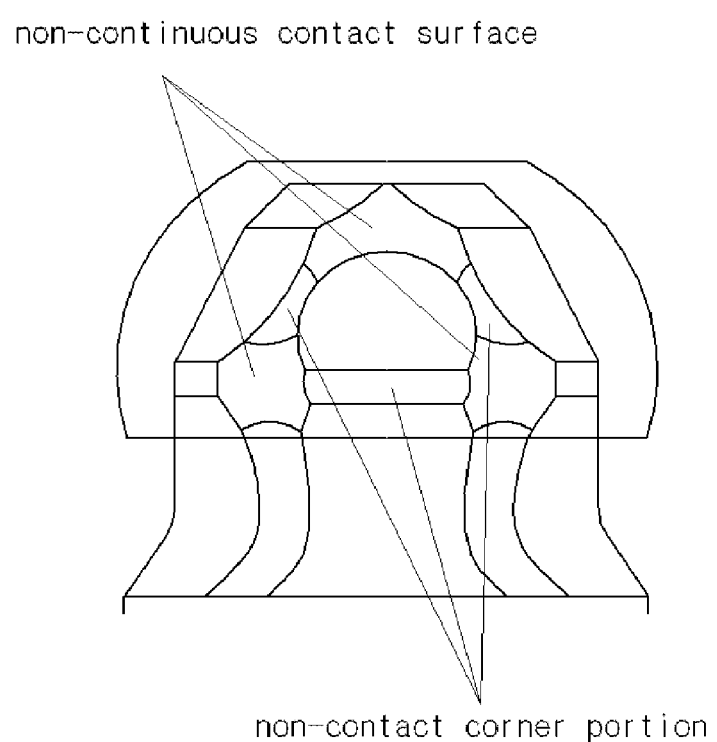

Referring to FIGS. 37 and 38, due to the fact that the outer surface of the trunnion 22" constituting the tripod type constant velocity joint in accordance with the third embodiment of the present invention has at least four surfaces such that at least one independent contact surface is positioned on each side, the trunnion 22" has a configuration in which continuous contact surfaces or at least two non-continuous contact surfaces are located along the corner portion of an optional surface, and at least one corner portion of the corner portions of a contact surface is maintained as a non-contact part such that a gap is created between the non-contact part and the circumferential inner surface of the inner roller.

Figure 39:
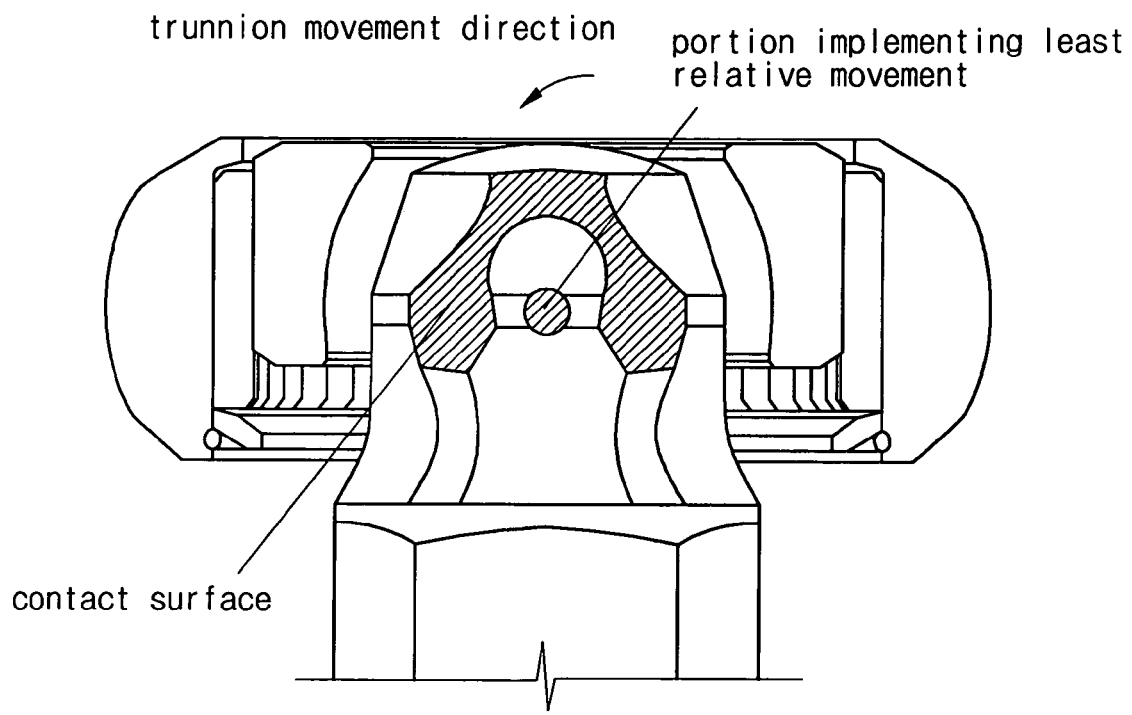
FIG. 39 is a cross-sectional view illustrating stress distribution in the tripod type constant velocity joint in accordance with the third embodiment of the present invention.

Due to the fact that the trunnion 22" is used as described above, as can be readily seen from FIG. 39, since a plurality of contact parts can be formed between the polyhedron trunnion 22" and the circumferential inner surface of the inner roller 23", power transmission stability is ensured, and it is possible to prevent driving force from being concentrated on one point, contact pressure from being increased, and two component elements from being brought into contact over their entire surfaces to generate excessively large frictional force.

Figure 40:
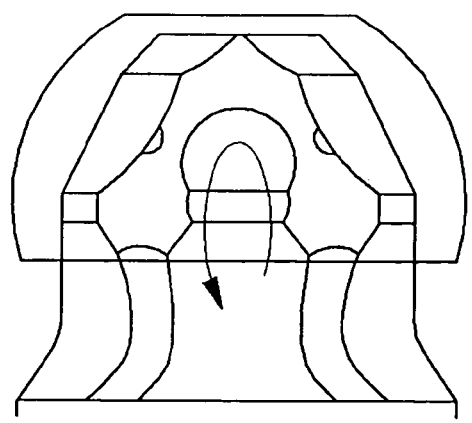
FIGS. 40 and 41 are perspective views illustrating paths through which lubricant can flow on the trunnion of the tripod type constant velocity joint in accordance with the third embodiment of the present invention.
Figure 41:
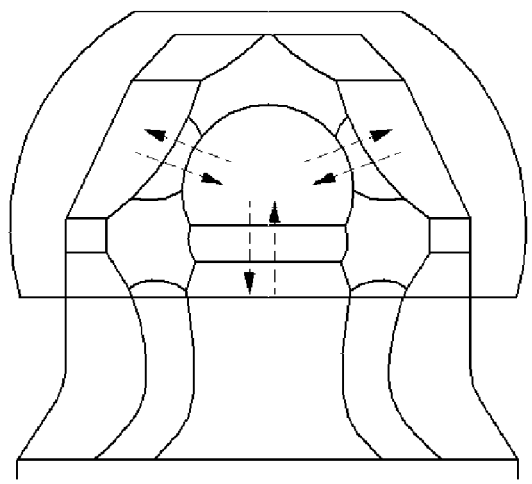

Also, due to the fact that the trunnion 22" is used as described above, as can be readily seen from FIGS. 40 and 41, since non-contact corner portions are defined between the contact parts as indicated by the arrows so that lubricant can be reliably provided to the portions implementing limited relative movement, it is possible to prevent durability of the constant velocity joint from being deteriorated due to insufficient lubrication.

Figure 42:
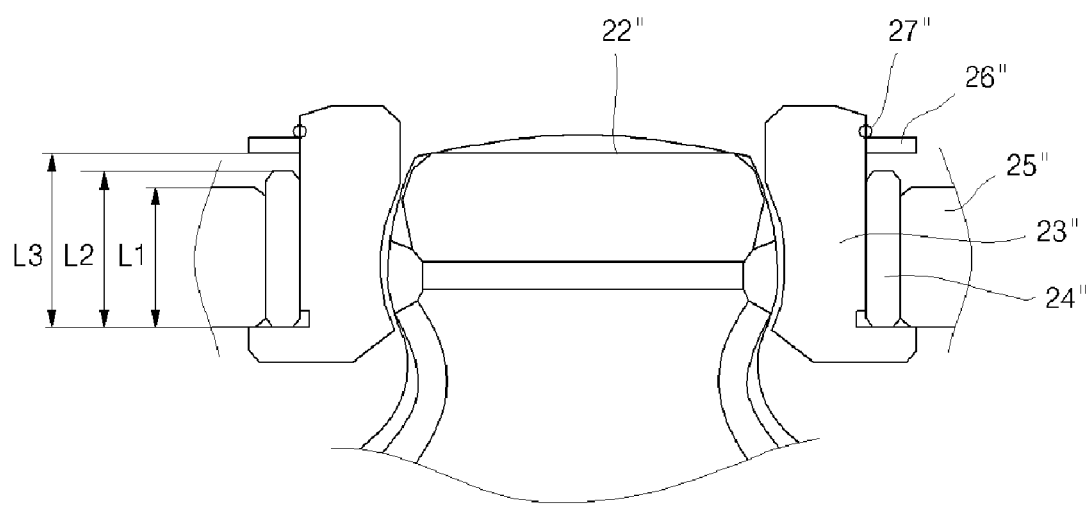
FIG. 42 is a cross-sectional view illustrating size relationships in a roller assembly of the tripod type constant velocity joint in accordance with the third embodiment of the present invention.

FIG. 42 is a cross-sectional view illustrating size relationships in a roller assembly of the tripod type constant velocity joint in accordance with the third embodiment of the present invention. Referring to FIG. 42, in the roller assembly of the tripod type constant velocity joint in accordance with the third embodiment of the present invention, a retainer portion for preventing release of the needle rollers 24" and the inner roller 23" is integrally formed on one end of the circumferential outer surface of each inner roller 23". Further, a retainer ring 26" and a retainer clip 27" are mounted to the other end of the circumferential outer surface of each inner roller 23" such that they are spaced apart from the needle rollers 24" and the inner roller 23" by a distance which allows the needle rollers 24" and the inner roller 23" to be sufficiently moved in the axial direction of the outer roller 25".

In this case, it is preferred that the width $L_1$ of the outer roller 25" and the length $L_2$ of the needle roller 24" have a relationship expressed by $L_1 < L_2/2$, and the width $L_1$ of the outer roller 25" and the distance $L_3$ through which the outer roller 25" can be moved in the axial direction of the inner roller 23" have a relationship expressed by $L_1 < L_3/2$. The roller assembly (composed of the inner roller 23", the outer roller 25", the needle rollers 24", the retainer ring 26" and the retainer clip 27") constructed in this way is prevented from being unintentionally disassembled. The roller assembly can be easily handled and assembled.

Figure 43:
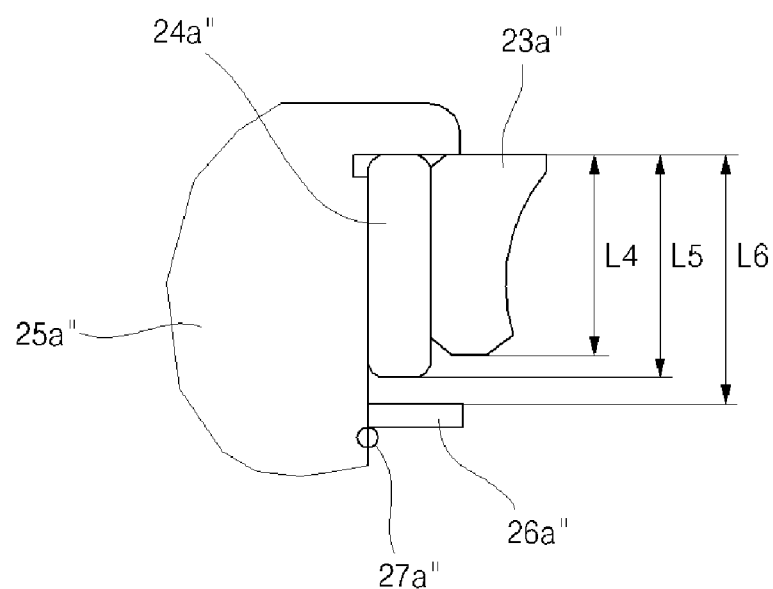
FIG. 43 is a cross-sectional view illustrating size relationships in another roller assembly of the tripod type constant velocity joint in accordance with the third embodiment of the present invention.

FIG. 43 is a cross-sectional view illustrating size relationships in another roller assembly of the tripod type constant velocity joint in accordance with the third embodiment of the present invention. Referring to FIG. 25, in another roller assembly of the tripod type constant velocity joint in accordance with the third embodiment of the present invention, a retainer portion for preventing release of the needle rollers 24a" and the inner roller 23a" is integrally formed on one end of the circumferential inner surface of each outer roller 25a". Further, a retainer ring 26a" and a retainer clip 27a" are mounted to the other end of the circumferential inner surface of each outer roller 25a" such that they are spaced apart from the needle rollers 24a" and the inner roller 23a" by a distance which allows the needle rollers 24a" and the inner roller 23a" to be sufficiently moved in the axial direction of the outer roller 25a".

In this case, it is preferred that the width $L_4$ of the inner roller 23a" and the length $L_5$ of the needle roller 24a" have a relationship expressed by $L_4 > L_5/2$, and the width $L_4$ of the inner roller 23a" and the distance $L_6$ through which the inner roller 23a" can be moved in the axial direction of the outer roller 25a" have a relationship expressed by $L_4 > L_6/2$. The roller assembly (composed of the inner roller 23a", the outer roller 25a", the needle rollers 24a", the retainer ring 26a" and the retainer clip 27a") constructed in this way is prevented from being unintentionally disassembled. The roller assembly can be easily handled and assembled.

As is apparent from the above descriptions, the tripod type constant velocity joint according to the present invention provides advantages as described below. Since a plurality of contact parts are formed between a trunnion having at least two polygonal surfaces and the inner surface of an inner roller, power transmission stability is ensured, and it is possible to prevent driving force from being concentrated on one point, contact pressure from being increased, and two component elements from being brought into contact over their entire surfaces to generate excessively large frictional force. Further, because portions implementing limited relative movement can be reliably lubricated using the straight portions of the trunnion, frictional force is decreased, axial force generation is suppressed, vibration of a vehicle is reduced, and durability of the vehicle is improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A tripod type constant velocity joint comprising:
   a housing having three track grooves defined at trisected positions of the housing and extending in an axial direction;
   a spider having three trunnions projectedly formed at trisected positions of the spider to be respectively inserted into the track grooves of the housing, each of the trunnions having at least three independent contact surfaces on each side and at least four six independent contact surfaces on both sides subjecting to a load;
   inner rollers each having an inner surface of a concavely curved contour for receiving a corresponding one of the trunnions therein;
   a plurality of needle rollers disposed to a circumferential outer surface of each inner roller; and
   outer rollers each mounted on an outer surface of each inner roller with the needle rollers engaged there-between.

2. The tripod type constant velocity joint as claimed in claim 1, wherein a non-contact corner portion is formed on the trunnion between contact surfaces so that lubricant can be reliably provided to portions which implement limited relative movement.

3. The tripod type constant velocity joint as claimed in claim 1, further comprising:
   retainer rings and retainer clips, each of which installed on the outer surface of the respective inner roller such that they are spaced apart from the needle rollers and the outer rollers by a distance for allowing the needle rollers and the outer rollers to be sufficiently moved in an axial direction, and to prevent the needle rollers and the outer rollers from being released.

4. The tripod type constant velocity joint as claimed in claim 1, further comprising:
   retainer rings and retainer clips, each of which installed on the inner surface of the respective outer roller such that they are spaced apart from the needle rollers and the outer rollers by a distance for allowing the needle rollers and the inner rollers to be sufficiently moved in an axial direction, and to prevent the needle rollers and the inner rollers from being released.

5. The tripod type constant velocity joint comprising:
   a housing having three track grooves which are defined at trisected positions of the housing along a circumferential direction;
   a spider having three trunnions of generally oval or elliptical cross-sectional shape which are projectedly formed at trisected positions of the spider to be respectively inserted into the track grooves of the housing, each of the trunnions having at least one independent contact surface on each side subjecting to a load;
   inner rollers each having an inner surface of a concavely curved contour for receiving a corresponding one of the trunnions therein;
   a plurality of needle rollers disposed to a circumferential outer surface of each inner roller;
   outer rollers each mounted on an outer surface of each inner roller with the needle rollers engaged there-between; and
   retainer rings and retainer clips, each of which installed on the outer surface of the respective inner roller such that they are spaced apart from the needle rollers and the outer rollers by a distance for allowing the needle rollers and the outer rollers to be sufficiently moved in an axial direction, and to prevent the needle rollers and the outer rollers from being released.

6. The tripod type constant velocity joint as claimed in claim 5, wherein a width $L_1$ of the outer roller and a length $L_2$ of the needle roller have a relationship expressed by $L_1 < L_2/2$.

7. The tripod type constant velocity joint as claimed in claim 5, wherein the width $L_1$ of the outer roller and a distance $L_3$ through which the outer roller can be moved in the axial direction of the inner roller have a relationship expressed by $L_1 < L_3 2$.

8. The tripod type constant velocity joint as claimed in claim 5, wherein the at least one independent contact surface is provided in the form of a continuous contact surface.

9. The tripod type constant velocity joint as claimed in claim 8, wherein at least one non-contact surface is provided adjacent to the continuous contact surface such that a gap is created between the at least one non-contact surface and the circumferential inner surface of the inner roller.

10. The tripod type constant velocity joint as claimed in claim 5, wherein the at least one independent contact surface is provided in the form of plural contact surfaces combined with plural non-contact surfaces formed adjacent to the plural contact surfaces such that a gap is created between the non-contact surfaces and the circumferential inner surface of the inner roller.

11. The tripod type constant velocity joint comprising:
a housing having three track grooves which are defined at trisected positions of the housing along a circumferential direction;
a spider having three trunnions of generally oval or elliptical cross-sectional shape which are projectedly formed at trisected positions of the spider to be respectively inserted into the track grooves of the housing, each of the trunnions having at least one independent contact surface on each side subjecting to a load;
inner rollers each having an inner surface of a concavely curved contour for receiving a corresponding one of the trunnions therein;
a plurality of needle rollers disposed to a circumferential outer surface of each inner roller;
outer rollers each mounted on an outer surface of each inner roller with the needle rollers engaged there-between; and
retainer rings and retainer clips, each of which installed on the inner surface of the respective outer roller such that they are spaced apart from the needle rollers and the outer rollers by a distance for allowing the needle rollers and the inner rollers to be sufficiently moved in an axial direction, and to prevent the needle rollers and the inner rollers from being released.

12. The tripod type constant velocity joint as claimed in claim 11, wherein a width $L_4$ of the inner roller and a length $L_5$ of the needle roller have a relationship expressed by $L_4 > L_5/2$.

13. The tripod type constant velocity joint as claimed in claim 11, wherein the width $L_4$ of the inner roller and a distance $L_6$ through which the inner roller can be moved in the axial direction of the outer roller have a relationship expressed by $L_4 > L_6/2$.

14. A tripod type constant velocity joint comprising:
a housing having three track grooves which are defined at trisected positions of the housing along a circumferential direction;
a spider having three trunnions, each of the trunnions having a neck portion, and a body portion of generally oval or elliptical cross-sectional shape which is projectedly formed at trisected positions of the spider to be respectively inserted into the track grooves of the housing, said body portion of generally oval or elliptical cross-sectional shape having two opposing side surfaces subjecting to a load and two opposing side surfaces not subjecting to a load, with a thickness between the two opposing side surfaces not subjecting to the load being smaller than that between the two opposing side surfaces subjecting to the load, each of the trunnions having at least one independent contact surface on each side of the two opposing side surfaces subjecting to the load, the at least one independent contact surface disposed on circumferential area of the opposing side surfaces subjecting to the load;
inner rollers each having an inner surface of a concavely curved contour for receiving a corresponding one of the trunnions therein;
a plurality of needle rollers disposed to a circumferential outer surface of each inner roller; and
outer rollers each mounted on an outer surface of each inner roller with the needle rollers engaged there-between.

15. The tripod type constant velocity joint as claimed in claim 14, wherein the at least one independent contact surface is provided in the form of a continuous contact surface, and wherein at least one non-contact surface is provided adjacent to the continuous contact surface such that a gap is created between the at least one non-contact surface and the circumferential inner surface of the inner roller.

16. The tripod type constant velocity joint as claimed in claim 14, wherein the at least one independent contact surface is provided in the form of plural contact surfaces combined with plural non-contact surfaces formed adjacent to the plural contact surfaces such that a gap is created between the non-contact surfaces and the circumferential inner surface of the inner roller.

* * * * *

UNITED STATES PATENT AND TRADEMARK OFFICE
CERTIFICATE OF CORRECTION

PATENT NO. : 8,298,092 B2
APPLICATION NO. : 12/978238
DATED : October 30, 2012
INVENTOR(S) : Jeong Hyun Cho et al.

Page 1 of 1

It is certified that error appears in the above-identified patent and that said Letters Patent is hereby corrected as shown below:

In claim 1, col. 13, line 53, the wording "four six" should read --six--.
In claim 5, col. 14, line 20, the wording "The" should read --A--.
In claim 11, col. 15, line 1, the wording "The" should read --A--.

Signed and Sealed this
Ninth Day of April, 2013

Teresa Stanek Rea
*Acting Director of the United States Patent and Trademark Office*